United States Patent
Guen

(10) Patent No.: US 10,930,986 B2
(45) Date of Patent: Feb. 23, 2021

(54) RECHARGEABLE BATTERY

(71) Applicant: Samsung SDI Co., Ltd., Yongin-si (KR)

(72) Inventor: Minhyung Guen, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 104 days.

(21) Appl. No.: 16/301,994

(22) PCT Filed: Jun. 15, 2017

(86) PCT No.: PCT/KR2017/006233
§ 371 (c)(1),
(2) Date: Nov. 15, 2018

(87) PCT Pub. No.: WO2018/004159
PCT Pub. Date: Jan. 4, 2018

(65) Prior Publication Data
US 2019/0288269 A1  Sep. 19, 2019

(30) Foreign Application Priority Data

Jun. 28, 2016 (KR) .................. 10-2016-0080954

(51) Int. Cl.
*H01M 4/02* (2006.01)
*H01M 50/572* (2021.01)
(Continued)

(52) U.S. Cl.
CPC ......... *H01M 50/572* (2021.01); *H01M 10/04* (2013.01); *H01M 50/147* (2021.01);
(Continued)

(58) Field of Classification Search
CPC ........................................ H01M 4/02
See application file for complete search history.

(56) References Cited

U.S. PATENT DOCUMENTS

2012/0148884 A1  6/2012  Kim
2013/0011703 A1  1/2013  Kim et al.
(Continued)

FOREIGN PATENT DOCUMENTS

EP  2495785 A1  9/2012
EP  2551938 A1  1/2013
(Continued)

OTHER PUBLICATIONS

EPO Extended Search Report dated Nov. 4, 2019, for corresponding European Patent Application No. 17820436.8 (6 pages).
(Continued)

*Primary Examiner* — Jacob B Marks
(74) *Attorney, Agent, or Firm* — Lewis Roca Rothgerber Christie LLP

(57) ABSTRACT

A rechargeable battery according to an exemplary embodiment of the present invention includes: an electrode assembly including a first electrode, a second electrode, and a separator that is disposed between the first electrode and the second electrode; a case where the electrode assembly is embedded; a cap plate that is coupled to an opening of the case; and a first electrode terminal provided on an upper side of the cap plate and having a first plate terminal that is electrically connected with the cap plate through a fuse portion and a second electrode terminal provided on the upper side of the cap plate and that is electrically connected with the second electrode by penetrating through the cap plate.

8 Claims, 4 Drawing Sheets

(51) Int. Cl.
*H01M 10/04* (2006.01)
*H01M 50/147* (2021.01)
*H01M 50/543* (2021.01)

(52) U.S. Cl.
CPC .... *H01M 50/543* (2021.01); *H01M 2200/103* (2013.01); *H01M 2200/20* (2013.01)

(56) References Cited

U.S. PATENT DOCUMENTS

| | | |
|---|---|---|
| 2013/0089760 A1 | 4/2013 | Kim et al. |
| 2013/0196179 A1 | 8/2013 | Han et al. |
| 2014/0377601 A1 | 12/2014 | Kim |
| 2016/0043378 A1 | 2/2016 | Guen et al. |
| 2016/0093865 A1* | 3/2016 | Kim ....................... H01M 2/30 |
| | | 429/179 |

FOREIGN PATENT DOCUMENTS

| | | |
|---|---|---|
| EP | 2793295 A2 | 10/2014 |
| KR | 10-2012-0064237 A | 6/2012 |
| KR | 10-2013-0006280 A | 1/2013 |
| KR | 10-2013-0036989 A | 4/2013 |
| KR | 10-2013-0089134 A | 8/2013 |
| KR | 10-2014-0147351 A | 12/2014 |
| KR | 10-2016-0018262 A | 2/2016 |

OTHER PUBLICATIONS

Office action issued in corresponding Chinese Application No. 201780034302.2, dated Dec. 3, 2020, 12 pages.

* cited by examiner

RECHARGEABLE BATTERY

CROSS-REFERENCE TO RELATED APPLICATION(S)

This application is a National Phase Patent Application of International Patent Application Number PCT/KR2017/006233, filed on Jun. 15, 2017, which claims priority of Korean Patent Application No. 10-2016-0080954, filed Jun. 28, 2016. The entire contents of both of which are incorporated herein by reference.

TECHNICAL FIELD

The present invention relates to a rechargeable battery.

BACKGROUND ART

A rechargeable battery is a battery that repeatedly performs charging and discharging, different from a primary battery. A rechargeable battery with small capacity is used in a portable small electronic device, such as a mobile phone, a notebook computer, and a camcorder, or is used as a motor driving power source for a hybrid vehicle and an electric vehicle.

The rechargeable battery includes an electrode assembly that includes a positive electrode, a negative electrode, and a separator that is disposed between the positive electrode and the negative electrode. The electrode assembly is received in the case and performs charging and discharging, and the case includes a terminal to receive or supply a current. The case may be provided as a metal plate or pouch.

Since the rechargeable battery iteratively performs charging and discharging, excessive heat may be generated in the case or an electrolyte solution may be decomposed. In addition, an over-current may flow due to a short circuit and the like in the rechargeable battery. In this case, an internal pressure of the rechargeable battery is increased, thereby causing firing or explosion of the rechargeable battery.

DISCLOSURE

Technical Problem

The present invention has been made in an effort to provide a rechargeable battery of which safety is improved by preventing firing or explosion even when an over-current flows.

Technical Solution

A rechargeable battery according to an exemplary embodiment of the present invention includes: an electrode assembly including a first electrode, a second electrode, and a separator that is disposed between the first electrode and the second electrode; a case where the electrode assembly is embedded; a cap plate that is coupled to an opening of the case; and a first electrode terminal provided on an upper side of the cap plate and having a first plate terminal that is electrically connected with the cap plate through a fuse portion and a second electrode terminal provided on the upper side of the cap plate and that is electrically connected with the second electrode by penetrating through the cap plate.

The cap plate may include a hose hole that is formed below the fuse portion such that a melted solution of the fuse portion is introduced into the cap plate.

A first current collecting plate that electrically connects an uncoated region of the first electrode and a bottom side of the cap plate may be formed in the case.

The rechargeable battery may further include a first upper side insulation member that is disposed between the first plate terminal and the cap plate to electrically insulate the first electrode terminal.

The cap plate may include protrusion portions that are disposed apart from each other at opposite sides of the first plate terminal and protruded upward from the upper side of the cap plate.

The fuse portions may be disposed between the first plate terminal and the protrusion portions and may be thus connected to the first plate terminal and the protrusion portions.

The first plate terminal may include: terminal bonding portions that are connected with the fuse portions while facing the protrusion portions; and terminal protrusion portions that protrude toward the protrusion portions from opposite ends of the terminal bonding portions, and are disposed apart from side surfaces of the protrusion portions.

The fuse portion may be provided in plural, and the respective fuse portions may be disposed apart from each other in a short side direction of the cap plate and electrically connect the cap plate and the protrusion portions.

The fuse portion may be provided in plural, and the respective fuse portions may be disposed apart from each other in a protrusion height direction of the protrusion portion and electrically connect the cap plate and the protrusion portions.

Advantageous Effects

The rechargeable battery according to the exemplary embodiment of the present invention can be prevented from being fired or exploded even when an over-current flows due to a short circuit and the like in the case.

MODE FOR INVENTION

Figure 1:
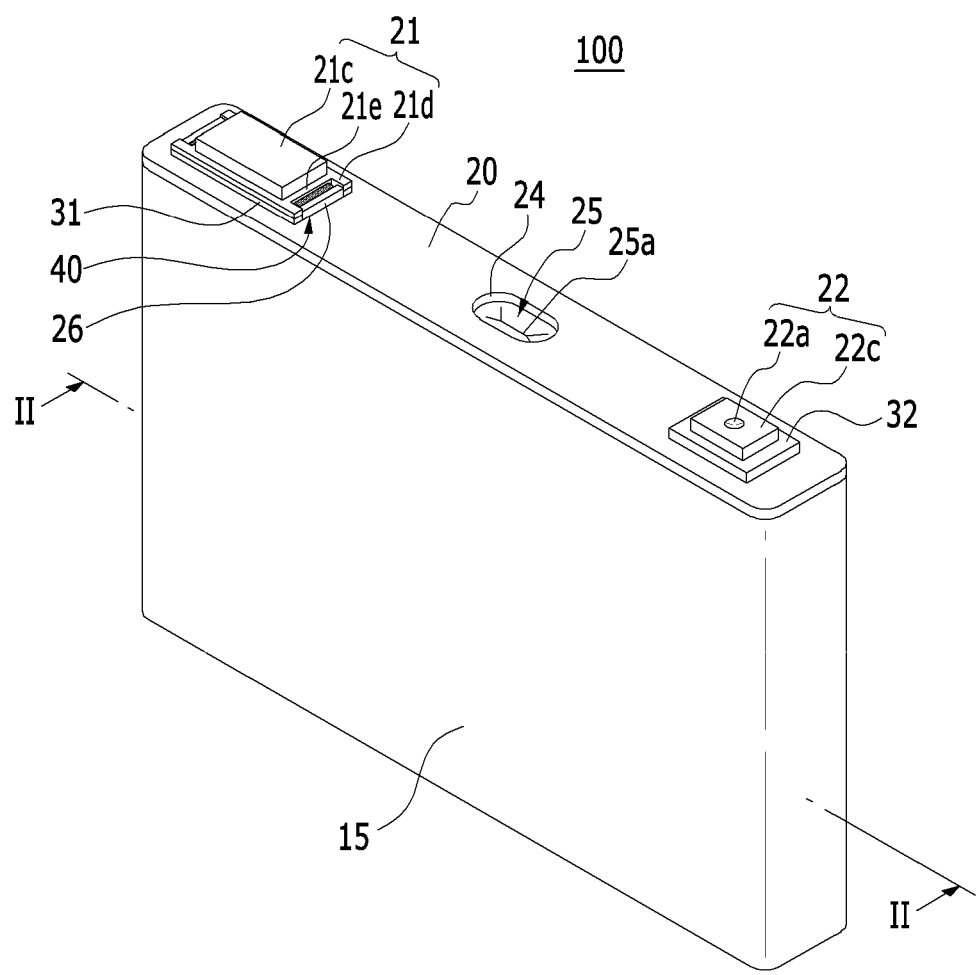
FIG. 1 is a perspective view of a rechargeable battery according to a first exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements.

Figure 2:
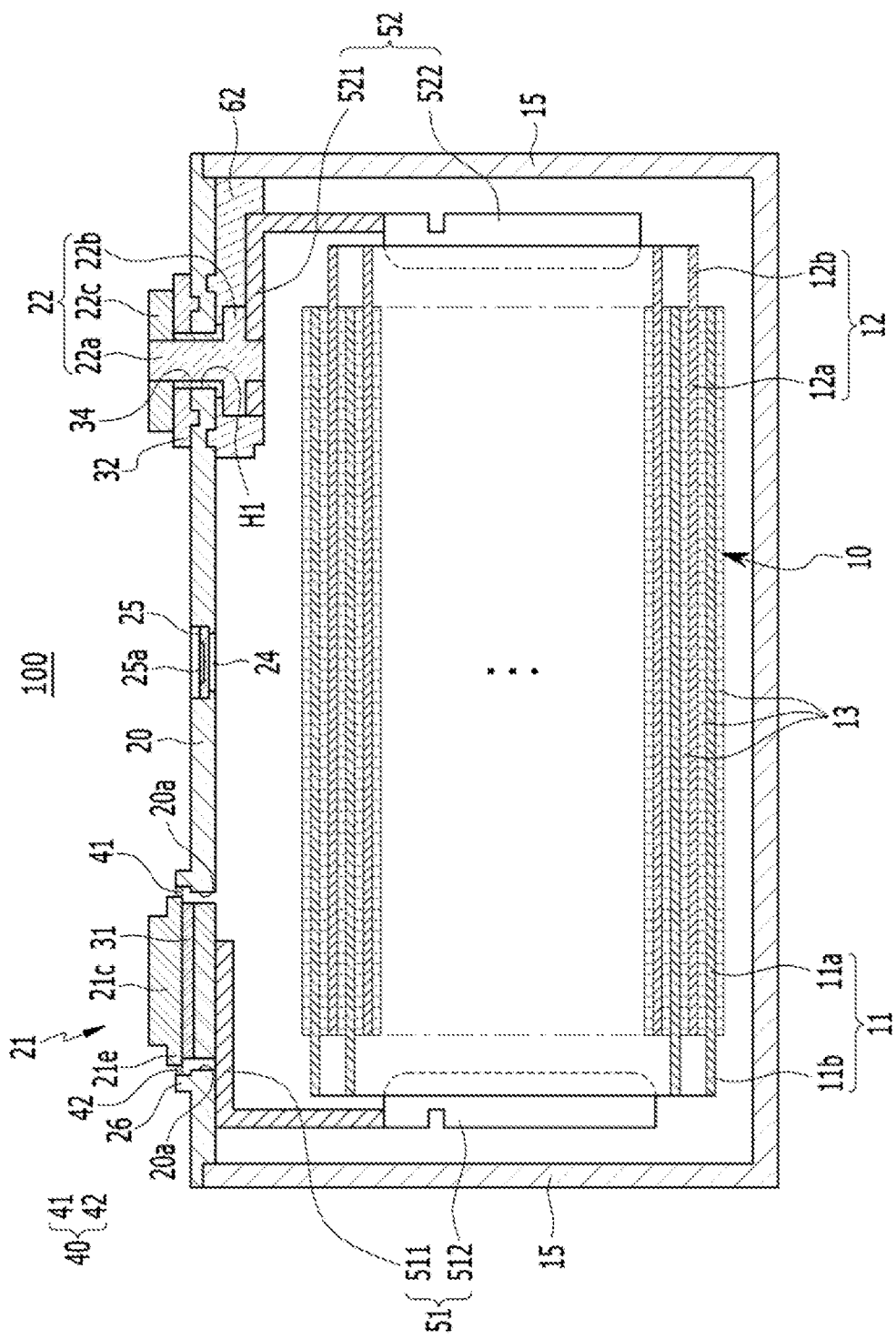
FIG. 2 is a cross-sectional view of FIG. 1, taken along the line II-II.

FIG. 1 is a perspective view of a rechargeable battery according to a first exemplary embodiment of the present invention, and FIG. 2 is a cross-sectional view of FIG. 1, taken along the line II-II.

Referring to FIG. 1 and FIG. 2, a rechargeable battery 100 includes an electrode assembly 10 that charges and discharges a current, and a case 15 where the electrode assembly 10 and an electrolyte solution are embedded.

For example, the electrode assembly 10 is formed by disposing a first electrode 11 and a second electrode 12 at opposite sides of a separator 13, which is an insulator, and spirally winding the first electrode 11, the separator 13, and the second electrode 12 in a jelly roll state. The first electrode 11 and the second electrode 12 respectively include coated regions 11a and 12a, in in which an active material is coated on a metal thin plate current collector, and uncoated regions 11b and 12b, each in which a current collector is not coated with an active material and is thus exposed.

The first electrode 11 is a positive electrode and the current collector of the first electrode 11 is formed of a thin aluminum plate, and the second electrode 12 is a negative electrode and the current collector of the second electrode 12 is formed of a thin copper plate. The uncoated region 11b of the first electrode 11 may be formed at one end of the spiral-wound first electrode 11. The uncoated region 12b of the second electrode 12 may be formed at one end of the spiral-wound second electrode 12. In addition, the uncoated regions 11b and 12b may be disposed at opposite ends of the electrode assembly 10.

The rechargeable battery 100 includes a cap plate 20 that is coupled to an opening of the case 15, a first electrode terminal 21, and a second electrode terminal 22. The first and second electrode terminals 21 and 22 are disposed in the cap plate 20.

The case 15 is substantially formed in the shape of a cuboid to set a space for receiving the electrode assembly 10. The opening of the case 15 is formed at one side of the cuboid such that the electrode assembly 10 can be inserted into the internal space therethrough from the outside.

The cap plate 20 is provided in the opening of the case 15 to close and seal the case 15. For example, the case 15 and the cap plate 20 may be formed of an aluminum material and are welded to each other. That is, after insertion of the electrode assembly 10 into the case 15, the cap plate 20 may be welded to the opening of the case 15.

The cap plate 20 includes at least one opening. For example, the cap plate 20 may include a terminal hole H1 and a vent hole 24.

The vent hole 24 is closed and sealed by a vent plate 25 to discharge internal gas and internal pressure generated due to charging and discharging of the rechargeable battery 100. When the internal pressure of the rechargeable battery 100 reaches a predetermined pressure, the vent plate 25 is ruptured and thus the vent hole 24 is opened. The vent plate 25 includes a notch 25a that induces a rupture.

The first electrode terminal 21 and the second electrode terminal 22 are respectively disposed at an outer side of the cap plate 20 and are electrically connected to the electrode assembly 10. The first electrode terminal 21 and the second electrode terminal 22 are electrically connected with the first electrode 11 and the second electrode 12 of the electrode assembly 10 through a first current collecting plate 51 and a second current collecting plate 52.

For example, the first electrode terminal 21 includes a first plate terminal 21c that is disposed at an outer side of the cap plate 20. A first upper side insulation member 31 that is disposed between the first plate terminal 21c and the cap plate 20 insulates between the first plate terminal 21c and the cap plate 20. The first plate terminal 21c is disposed at an outer side of the cap plate 20 while disposing the first upper side insulation member 31 therebetween.

The first electrode terminal 21 may be connected with the first electrode 11 through the first current collecting plate 51 that is electrically connected to the first electrode 11 of the electrode assembly 10. For example, the first current collecting plate 51 includes a terminal connection portion 511 that is connected to the cap plate 20 and an electrode connection portion 512 that is connected to the uncoated region 11b of the electrode assembly 10. That is, the first current collecting plate 51 is coupled to a bottom side of the cap plate 20 and the cap plate 20 is electrically connected with the first electrode 11.

The second electrode terminal 22 includes a second plate terminal 22c that is disposed at an outer side of the cap plate 20 and a second rivet terminal 22a that penetrates the second plate terminal 22c. The second rivet terminal 22a is connected to the second current collecting plate 52 through one side thereof, and the other side of the second rivet terminal 22a is coupled with a second plate terminal 22b by being compression-molded.

Figure 3:
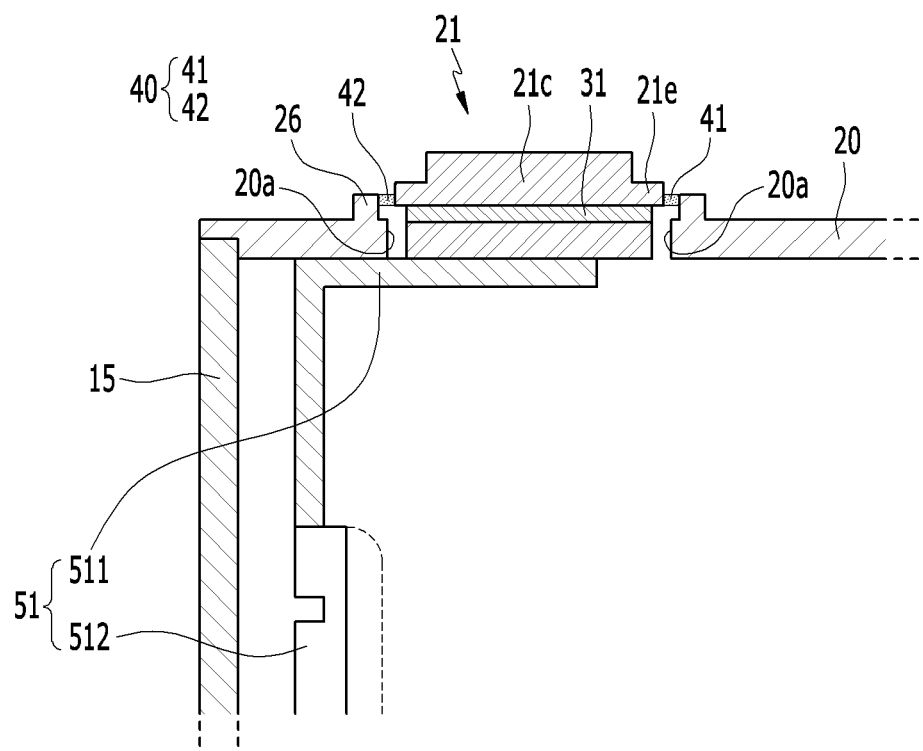
FIG. 3 is a detailed cross-sectional view of a first electrode terminal in FIG. 2.

FIG. 3 is a detailed cross-sectional view of the first electrode terminal of FIG. 2.

Referring to FIG. 3, the first electrode terminal 21 includes the first plate terminal 21c that is disposed at an upper end of the cap plate 20. A protrusion portion 26 that protrudes to the outside is formed in the cap plate 20. The protrusion portion 26 is disposed at a side surface of the first plate terminal 21c on the upper side of the cap plate 20.

The first electrode terminal 21 includes the first plate terminal 21c, terminal bonding portions 21e, and terminal protrusion portions 21d. A fuse portion 40 may be disposed between the terminal bonding portion 21e and the protrusion portion 26. The fuse portion 40 may be formed by laser welding. The protrusion portion 26 of the cap plate 20 may have a protrusion height that is shorter than that of the terminal bonding portion 21e to more easily form the fuse portion 40. Alternatively, the terminal bonding portion 21e and the protrusion portion 26 may have the same protrusion height.

The fuse portion 40 may be provided at opposite sides of the first plate terminal 21c. In this case, the protruding portion 26 may be provided at opposite sides of the first plate terminal 21c.

The first electrode terminal 21 is connected with the cap plate 20 through the fuse portion 40. Thus, the cap plate 20 is electrically connected to the first electrode 11, and when an overcurrent flows to the rechargeable battery 100, the fuse 40 may be burned or melted such that electrical connection between the first electrode terminal 21 and the cap plate 20 is disconnected.

Fuse holes 20a that are opened downward of the cap plate 20 may be formed at opposite sides of the first plate terminal 21c. Thus, a melted compound of the fuse portions 40 flows to the fuse holes 20a such that the first plate terminal 21c and the cap plate 20 may be electrically disconnected. The melted compound of the fuse portions 40 may flow into the case 15 through the fuse holes 20a.

The first upper side insulation member 31 is formed below the first plate terminal 21c, and may be disposed between the fuse holes 20a that are disposed opposite to each other.

Figure 4:
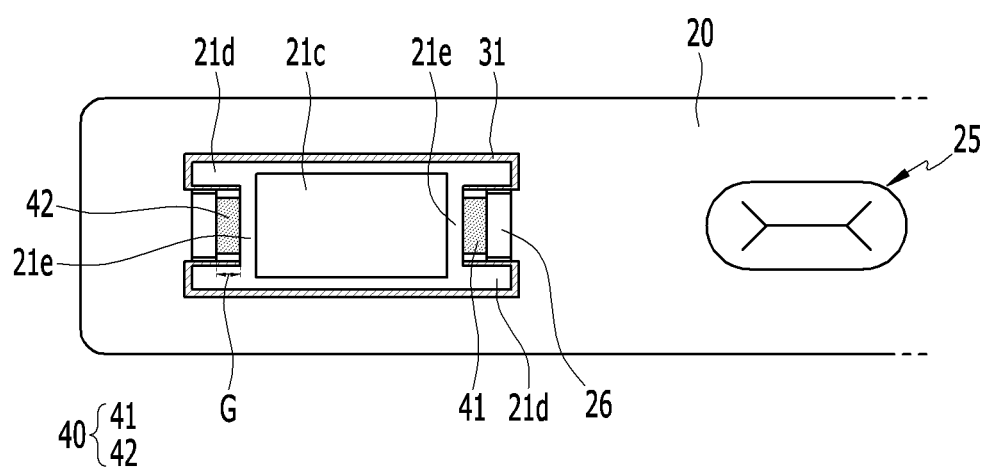
FIG. 4 is a top plan view of a first exemplary embodiment of the first electrode terminal in FIG. 3.
Figure 5:
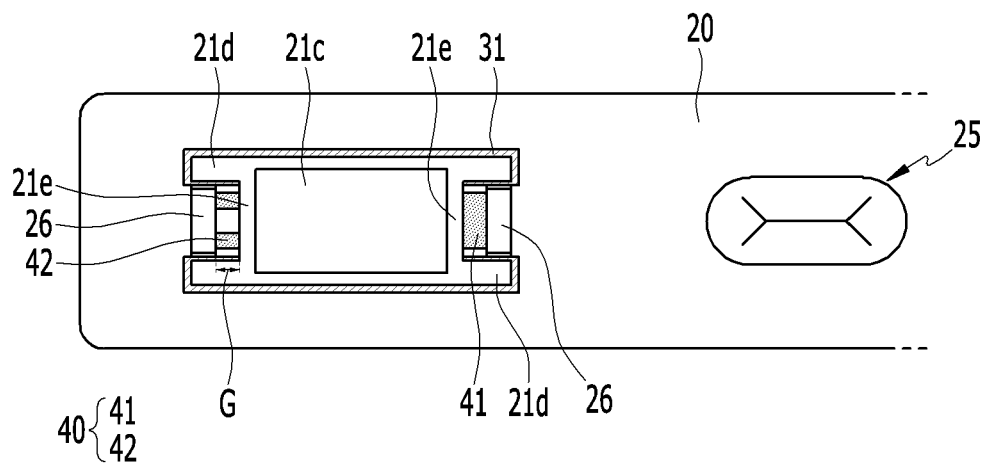
FIG. 5 is a top plan view of a second exemplary embodiment of the first electrode terminal in FIG. 3.

FIG. 4 is a top plan view of a first exemplary embodiment of the first electrode terminal of FIG. 3, and FIG. 5 is a top plan view of a second exemplary embodiment of the first electrode terminal of FIG. 3.

Referring to FIG. 4 and FIG. 5, the first plate terminal 21a and the protrusion portion 26 may be electrically connected with each other through the fuse portions 40. The fuse portions 40 may be formed at opposite sides of the first plate terminal 21c. However, this is not restrictive, and the fuse portion 40 may be formed at only one side of the first plate terminal 21c. Hereinafter, the fuse portions 40 provided at opposite sides of the first plate terminal 21c will be exemplarily described.

The protrusion portion 26 may be shorter than a width of the first plate terminal 21c in a short side direction of the cap plate 20. The protrusion portion 26 may protrude along the terminal bonding portion 21e formed inside the first plate terminal 21c. The first plate terminal 21c may be more easily installed in the cap plate 20 by the terminal protrusion portions 21d and the protruding portions 26. That is, the protrusion portion 26 may guide an installation location of the first plate terminal 21c.

The first plate terminal 21c may include the terminal protrusion portions 21d that protrude from lateral side surfaces of the terminal bonding portion 21e and extend to the side surface of the protrusion portions 26. The terminal protrusion portions 21d and the protrusion portions 26 are disposed apart from each other, and the terminal protrusion portion 21d extend from lateral sides of the protrusion portions 26 to dispose the protrusion portions 26 therein. That is, the terminal protrusion portions 21d can protect the protrusion portions 26 and the fuse portions 40 from external impact and the like.

The first upper side insulation member 31 is formed along the first plate terminal 21c, and is larger than the first plate terminal 21c such that the first plate terminal 21c is seated on the first upper side insulation member 31. In particular, the first upper side insulation member 31 may protrude along the terminal protrusion portions 26 that protrude from the first plate terminal 21c.

The fuse portions 40 may include a first fuse portion 41 and a second fuse portion 42 that are formed at opposite sides of the first plate terminal 21c.

For example, the fuse portion 41 and the second fuse portion 42 may be formed in a line between the protrusion portions 26 and the terminal bonding portions 21e.

Alternatively, the fuse portion 41 is formed in a line between the protrusion portions 26 and the terminal bonding portions 21e, and second fuse portions 42 may be provided in plural and may be distanced from each other in a short side direction of the cap plate 20. That is, the second fuse portions 42 are provided in plural between the protrusion portions 26 and the terminal bonding portions 21e, and each of the plurality of fuse portions 42 may be separated from one another.

Alternatively, the first fuse portion 41 and the second fuse portion 42 are equally provided in plural, and the respectively fuse portions may be disposed apart from each other.

The fuse portions 40 are not limited to the above-described example, and may have various structures to enhance reliability of performance and rigidity so as to not be disconnected due external impact and the like.

Figure 6:
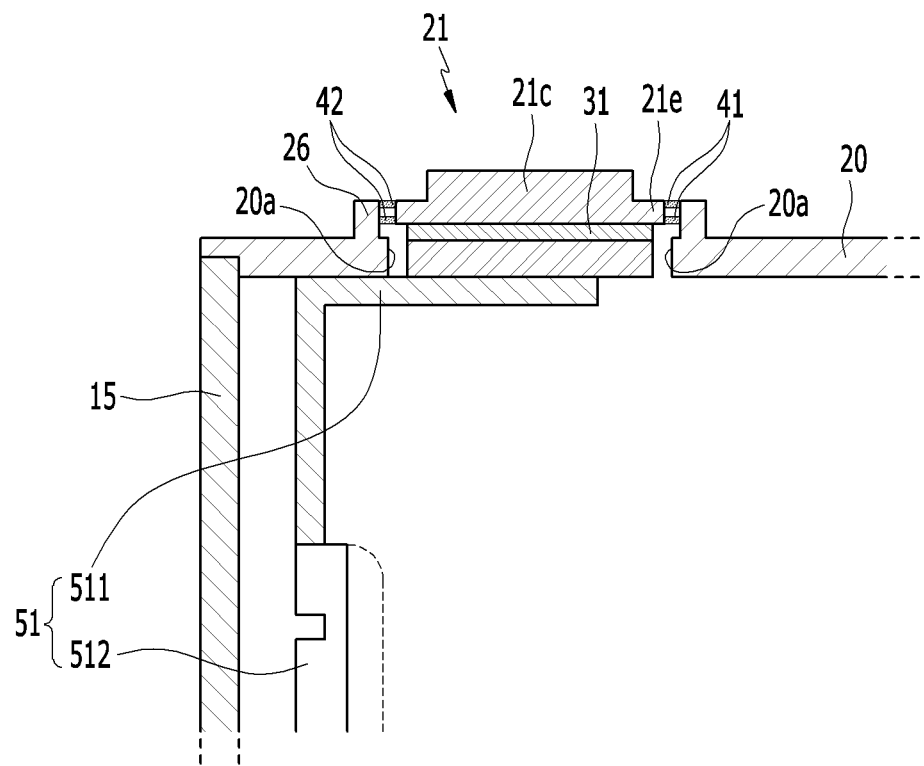
FIG. 6 is a top plan view of a third exemplary embodiment of the first electrode terminal in FIG. 2.

FIG. 6 is a cross-sectional view of a third exemplary embodiment of the first electrode terminal of FIG. 2

Referring to FIG. 6, the fuse portions 40 may be layered between the protrusion portions 26 and the terminal bonding portions 21e. Thus, a plurality of layers may be formed, and the fuse portions 40 are disposed apart from each other in a protrusion direction of the protrusion portion 26 and may electrically connect the cap plate 20 and the protrusion portions 26. In this example, it will be described that the fuse portions 40 are formed by two layers.

The protrusion portions 26 protrude to an outer side direction of the cap plate 20, and an upper end of each protrusion portion 26 may have the same height as the terminal bonding portion 21e. Thus, the fuse portions 40 may be formed as layers along the protrusion height to the cap plate 20 from the upper end of the protrusion portion 26, and each fuse portion 40 may be disposed apart from one another. Thus, even when the upper end fuse portion 40 is damaged due to external impact, the cap plate 20 and the first electrode terminal 21 can be electrically connected with each other by the fuse portion 40 that is disposed at a lower end, and accordingly the first electrode terminal 21 charged to the first electrode 11 can be maintained, thereby improving safety of the rechargeable battery 100 from the external impact.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 100: rechargeable battery | 10: electrode assembly |
| 11: first electrode | 12: second electrode |
| 11a, 12a: coated region | 11b, 12b: uncoated region |
| 13: separator | 15: case |
| 20: cap plate | 20a: fuse hole |
| 21: first electrode terminal | 21c: first plate terminal |
| 21d: terminal protrusion portion | 21e: terminal bonding portion |
| 22: second electrode terminal | 22a: second rivet terminal |
| 22b: second flange | |
| 22c: second plate terminal | 24: vent hole |
| 25: vent plate | 26: protruding portion |
| 25a: notch | |
| 31: first upper side insulation member | |
| 32: second upper side insulation member | |
| 34: gasket | 51: first current collecting plate |
| 52: second current collecting plate | |
| 62: second bottom side insulation member | |
| 511, 521: terminal connection portion | |
| 512, 522: electrode connection portion | |
| 40: fuse portion | 41: first fuse portion |
| 42: second fuse portion | G: distance |
| H1: terminal hole | |

The invention claimed is:

1. A rechargeable battery comprising:
an electrode assembly including a first electrode, a second electrode, and a separator that is disposed between the first electrode and the second electrode;
a case where the electrode assembly is embedded;
a cap plate that is coupled to an opening of the case;

a first electrode terminal provided on an upper side of the cap plate and having a first plate terminal that is electrically connected with the cap plate through a fuse portion; and a second electrode terminal provided on the upper side of the cap plate and that is electrically connected with the second electrode by penetrating through the cap plate, wherein the cap plate comprises a fuse hole that is formed below the fuse portion such that a melted solution of the fuse portion is introduced into the cap plate.

2. The rechargeable battery of claim 1, wherein a first current collecting plate that electrically connects an uncoated region of the first electrode and a bottom side of the cap plate is formed in the case.

3. The rechargeable battery of claim 2, further comprising a first upper side insulation member that is disposed between the first plate terminal and the cap plate to electrically insulate the first electrode terminal.

4. The rechargeable battery of claim 1, wherein the cap plate comprises protrusion portions that are disposed apart from each other at opposite sides of the first plate terminal and protruded upward from the upper side of the cap plate.

5. The rechargeable battery of claim 4, wherein the fuse portion is provided in plural, and wherein the fuse portions are disposed between the first plate terminal and the protrusion portions and are thus connected to the first plate terminal and the protrusion portions.

6. The rechargeable battery of claim 5, wherein the first plate terminal comprises:

terminal bonding portions that are connected with the fuse portions while facing the protrusion portions; and terminal protrusion portions that protrude toward the protrusion portions from opposite ends of the terminal bonding portions and are disposed apart from side surfaces of the protrusion portions.

7. The rechargeable battery of claim 5, wherein the respective fuse portions are disposed apart from each other in a short side direction of the cap plate and electrically connect the cap plate and the protrusion portions.

8. The rechargeable battery of claim 5, wherein the respective fuse portions are disposed apart from each other in a protrusion height direction of the protrusion portions and electrically connect the cap plate and the protrusion portions.

* * * * *